United States Patent

Notani et al.

[15] 3,636,253

[45] Jan. 18, 1972

[54] MAGNETIC RECORDING AND REPRODUCING APPARATUS

[72] Inventors: Masaaki Notani, Osaka; Makoto Ashibe, Neyagawa-shi; Yasuo Nishitani, Moriguchi-shi; Keiziro Mihara, Osaka, all of Japan

[73] Assignee: Matsushita Electric Industrial Co., Ltd., Osaka, Japan

[22] Filed: Oct. 23, 1969

[21] Appl. No.: 868,850

[30] Foreign Application Priority Data

Oct. 29, 1968 Japan....................................43/80176
Oct. 30, 1968 Japan....................................43/79728
Nov. 20, 1968 Japan....................................43/102218

[52] U.S. Cl. ........................................178/6.6 DD, 178/6.6 P
[51] Int. Cl. ......................H04n 5/12, H04n 5/21, H04n 5/78
[58] Field of Search .....................178/6.6 A, 6.6 DD, 6.6 SF, 178/6.6 P

[56] References Cited

UNITED STATES PATENTS 3,397,283 8/1968 Stosberg et al.......................178/6.6 D

OTHER PUBLICATIONS

" Reviewing Slow-Motion Disc Principles" by Lee Stratton, Broadcast Engineering, p. 14– 16, & 18, February, 1969.

*Primary Examiner*—Terrell W. Fears
*Assistant Examiner*—Steven B. Pokotilow
*Attorney*—Stevens, Davis, Miller & Mosher

[57] ABSTRACT

In a magnetic recording and reproducing apparatus wherein at least one of a magnetic recording medium and a magnetic head is rotated about a certain point to record about one field of a television signal for an interlaced scanning system on the recording medium in the form of an annular track, means is provided for controlling the relative rotational speed in such a manner that the total circumference of the annular track on the recording medium formed by the magnetic head will be the length of the track of one horizontal synchronizing signal period of the television signal to be recorded multiplied by an integer, so that the horizontal synchronizing signal may not be disturbed during reproduction even when one and the same track is repeatedly reproduced.

5 Claims, 4 Drawing Figures

M. NOTANI,
M. ASHIBE,
Y. NI[illegible]ITANI
AND
K. MIHARA
INVENTORS

BY Stevens, Davis, Miller & Mosher
ATTORNEY

MAGNETIC RECORDING AND REPRODUCING APPARATUS

The present invention relates to a magnetic recording and reproducing apparatus wherein a magnetic head is brought into contact with a rotating disc-shaped or cylindrical magnetic recording medium or a magnetic head rotating at a high speed about a certain point is brought into contact with a stationary magnetic recording medium, whereby one field of television signal is recorded on a magnetic recording medium in the form of an annular recorded track.

This type of apparatus has conveniently been used heretofore for the reproduction of a television signal as a static image, since it enables the same recorded track to be easily repeatedly reproduced.

However, in using the apparatus for recording a television signal for an interlaced scanning system, while there will be no problem when a signal of one frame is to be recorded as one track in an annular shape, all of the horizontal synchronizing signals on the recorded track will not be equally spaced by a distance H and a distance of ½H will be formed either before or after the vertical synchronizing signal when a signal of one field is to be recorded as one track.

Namely, if one field of a television signal for an interlaced scanning system, of which number of the horizontal synchronizing signals $f_0$ within one frame is represented by the formula $f_0=2n+1$ wherein $n$ is a positive integer, is recorded, the horizontal synchronizing signals $f_1$ within one field will be $f_1=n+½$ and thus an error of one-half will occur.

Therefore, when the same track is continuously reproduced repeatedly as a static image in the process of the reproduction operation using the conventional apparatus, a lag equivalent to a half of the horizontal synchronizing signal occurs on every rotation or on reproduction of every field, with the result that the horizontal synchronizing signals are disturbed and a distortion occurs in the image reproduced.

An object of the present invention is to provide a magnetic recording and reproducing apparatus which, in order to obviate the above-described drawback of the conventional apparatus, is so constructed that the recorded tracks resulting from recording about one field of television signals for the interlaced scanning system will be the number of recorded tracks of one horizontal synchronizing signal multiplied by an integer.

Another object of the invention is to provide a magnetic recording and reproducing apparatus in which signals of one field are recorded in such a manner that they can be reproduced as a satisfactory static image, and which, therefore, can be produced in a smaller size than the conventional apparatus of the type wherein signals of one frame are recorded in the form of an annular track.

These and other objects, features and advantages of the present invention will be apparent from the following description taken in conjunction with the accompanying drawings, in which.

Figure 1:
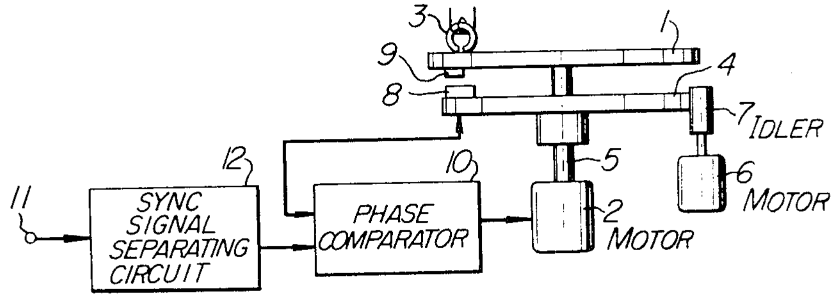
FIG. 1 is a side view diagrammatically showing an embodiment of the present invention.

Referring to FIG. 1, there is shown one form of the magnetic recording and reproducing apparatus according to the present invention, which includes a disc-shaped magnetic recording medium 1 driven from a motor 2, and a recording and reproducing magnetic head 3 in contact with said disc-shaped magnetic recording medium 1.

The magnetic head 3 is movable diametrically of the magnetic recording medium 1 stepwise but is held stationary during the process of recording or reproduction.

The magnetic recording medium 1 is operatively connected to the motor 2 through a driving shaft 5 and a rotary disc 4 is loosely mounted on the driving shaft 5 below the magnetic recording medium 1. This rotary disc 4 is rotated about the driving shaft 5 by an idler 7 which is driven from a motor 6.

A phase detecting head 8 is provided on the top surface of the rotary disc 4, and a magnet 9 is fixedly mounted on the confronting surface of the disc-shaped magnetic recording medium 1 in opposed relation to the phase detecting head 8.

Namely, the arrangement is such that a pulse signal is generated in the phase detecting head 8 each time the phase detecting head 8 and the magnet 9 get close to each other, and the pulse signal thus generated is fed to a phase comparator 10 upon being taken out by means of a slipring mechanism.

Reference numeral 11 designates an input terminal on which a continuous television signal is to be impressed, and 12 designates a vertical synchronizing signal separating circuit wherein the vertical synchronizing signal is separated from the television signal. The vertical synchronizing signal thus separated is supplied to the phase comparator 10 as an input.

In the phase comparator 10 the phase of the vertical synchronizing signal from the vertical synchronizing signal separating circuit 12 is compared with the phase of the pulse signal from the phase detecting head 8, and an output signal of the phase comparator corresponding to the phase difference is supplied to the motor 2 to control the rotational phase thereof in such a manner that the rotation of the disc-shaped magnetic recording medium 1 is maintained in a constant phase relation to the vertical synchronizing signal of the television signal.

Now, with the arrangement described above, if the rotary disc 4 is held stationary, the magnetic recording medium 1 will make 1 revolution within the period of one vertical synchronizing signal.

When a television signal of one field is impressed on the magnetic head 3 for interlaced scanning, it will be recorded on the magnetic recording medium 1 in the form of an annular track, but the problem of horizontal synchronizing signal lagging will occur as previously described. According to the present invention, therefore, the rotary disc 4 is rotated and the magnetic recording medium 1 is rotated at such a rate that it completes 1 revolution in the period of $TV±½TH(2n+1)$ wherein $TV$ (sec.) represents the period of vertical synchronizing signal and $TH$ (sec.) represents the period of the horizontal synchronizing signal.

In other words, the rotational speeds of the rotary disc 4 and the recording medium 1 are controlled so that the relation of $TV=2\pi/Ws-Wd$(sec.) may be established, wherein $Wd$ represents the rotational speed (radian/sec.) of the rotary disc and $Ws$ represents the rotational speed (radian/sec.) of the recording medium. In the control system represented by the relation of $$TV=(2\pi/Ws-Wd)\ \text{(sec.)} \tag{1}$$

if the rotary cycle of the magnetic recording medium 1 with respect to the immovable part (the magnetic head 3) is maintained at a period of $TV-½TH(2n+1)$, the problem resulting from the above-described irregularity of the synchronizing signal can be resolved. That is, the following relation should be made.

$$\frac{2\pi}{Ws}=TV-\frac{1}{2}TH(2n+1) \tag{2}$$

From the Formula 2

$$\frac{2\pi}{Ws}=TV\left\{1-\frac{1TH}{2TV}(2n+1)\right\}$$

$$TV=\frac{2\pi}{Ws\left\{1-\frac{1TH}{2TV}(2n+1)\right\}} \tag{3}$$

From the Formulas 1 and 2, $$\frac{2\pi}{Ws-Wd}=\frac{2\pi}{Ws\left\{1-\frac{1TH}{2TV}(2n+1)\right\}}$$

$$Wd=Ws-Ws\left\{1-\frac{TH}{2TV}(n+1)\right\}$$

$$=\frac{1}{2}\frac{Ws\cdot TH}{TV}(2n+1)\ \text{[rad./sec.]} \tag{4}$$

In this case, the movement volume D of the rotary disc 4 at a period of $TV$ is as follows:

$$D=Wd\cdot TV=\tfrac{1}{2}WsTH(2n+1)\ [\text{radian}] \qquad (5)$$

Now, according to formula (5), $WsTH$ denotes the movement volume of the magnetic recording medium 1 corresponding to a period of $TH$. Consequently, in a period $TV$, the above-described relations according to formulas (1) and (2) can be satisfied, when the rotary disc 4 is moved an odd number times one-half of the angle $WsTH$ corresponding to a horizontal synchronizing signal period.

In other words, the rotary disc 4 may be moved through an angle corresponding to the signal recording trace of a period of $\tfrac{1}{2}TH(2n+1)$. For example, if the rotary disc 4 is rotated at the rate of $$Wd=\frac{1}{2}\,\frac{Ws\cdot TH}{TV}(2n+1)\ \text{rad./sec.} \qquad (4)$$

in a direction opposite to the rotating direction of the magnetic recording medium 1, the rotation of the magnetic recording medium 1 will be delayed from the period $TV$ of the vertical synchronizing signal by a time equivalent to a half period of the horizontal synchronizing signal multiplied by an odd number, with respect to the immovable part (the magnetic head 3), and the magnetic recording medium 1 will rotate at a period of $TV+\tfrac{1}{2}TH(2n+1)$. On the other hand, if the rotary disc 4 is rotated in the same direction as the recording medium 1, the recording medium will rotate at a period of $TV-\tfrac{1}{2}THB(2n+1)$. Accordingly, the number of rotations of the motor (6) and the diameters of the idler (7) and the rotary disc (4) may be properly selected, and the value of $Wd$ should be selected to satisfy the formula (4).

Figure 2:
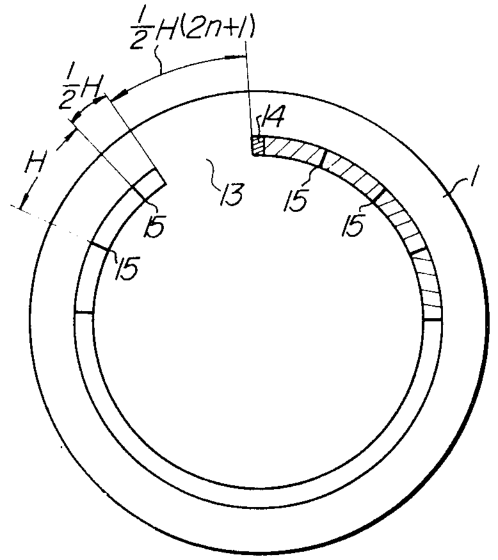
FIG. 2 is a diagram of a recorded track recorded by the apparatus of FIG. 1.

When a television signal of one field for interlaced scanning is impressed on the magnetic head 3, while rotating the magnetic recording medium 1 at a period of $TV+\tfrac{1}{2}TH(2n+1)$ as described above, the previously described step out in the process of reproduction can be eliminated, though an unrecorded blank of $\tfrac{1}{2}H(2n+1)$ is formed as shown in FIG. 2, and such unrecorded blank will not pose any problem if the value of $n$ in $\tfrac{1}{2}H(2n+1)$ is made sufficiently small. In FIG. 2, reference numeral 14 designates the vertical synchronizing signal. Similarly, when the recording medium 1 is rotated at a period of $TV=\tfrac{1}{2}TH(2n+1)$, dual recording occurs at the portion of $\tfrac{1}{2}H(2n+1)$ but such dual recording will not pose particular problem when the value of $n$ is sufficiently small. If it is desired to further lessen the dual recording, this may be achieved by selecting the signal to be imposed on the magnetic head 3 to have a section of $TV-\tfrac{1}{2}TH(2n+1)$.

Figure 3:
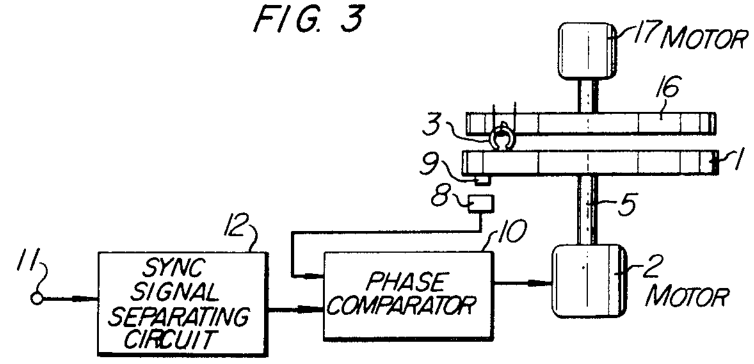
FIGS. 3 and 4 are side views diagrammatically showing other embodiments of the invention.

Another embodiment of the present invention is shown in FIG. 3, in which reference numerals 1, 2, 3, 5, 8, 9, 10, 11 and 12 designate the same parts as indicated by the same numerals in FIG. 1. The difference between the apparatus shown in FIG. 3 and that shown in FIG. 1 resides in the fact that in the former the recording and reproducing magnetic head 3 is mounted on a rotary disc 16 for rotation therewith, which rotary disc is rotatable about an axis coaxial with the center of rotation of the magnetic recording medium 1.

The rotary disc 16 is driven from a motor 17 at such a rate that the magnetic head 3 will be carried over a distance, corresponding to the length of signal recorded track formed in a period of $\tfrac{1}{2}H(2n+1)$, during 1 revolution of the magnetic recording medium 1. For example, when the magnetic head 3 is rotated a distance, corresponding to the length of signal recorded track formed in the period of $\tfrac{1}{2}H(2n+1)$, in the same direction as the magnetic recording medium 1, while the said recording medium is being rotated at such a rate as to complete its 1 revolution in a period of $TV$ (sec.), an unrecorded band will be formed in the period of $\tfrac{1}{2}H(2n+1)$ and thus the same effect as obtainable from the apparatus of FIG. 1 can be expected. The same is true when the rotary disc 16 and the magnetic recording medium 1 are replaced by each other in FIG. 3.

Figure 4:
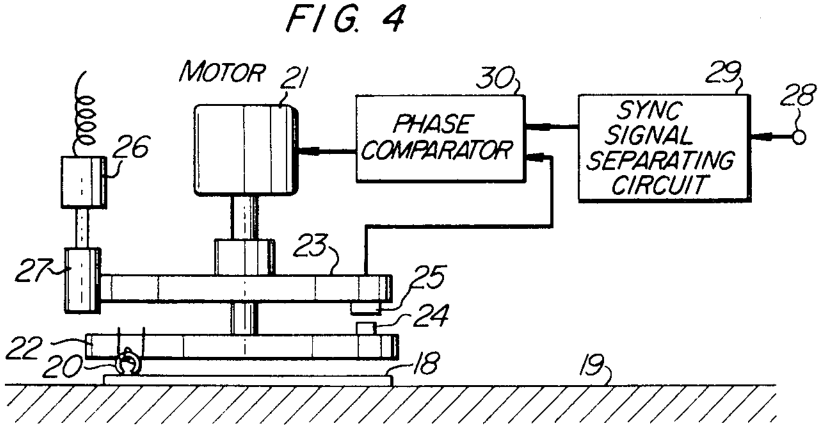

FIG. 4 shows still another embodiment of the present invention. According to this embodiment, a sheetlike magnetic recording medium 18 is fixed on a baseplate 19, while a magnetic head 20 is mounted on a rotary disc 22 driven from a motor 21. A signal is recorded or reproduced by the magnetic head 20 which is carried by the rotary disc 22 in contact with the recording medium 18.

The magnetic head 20 is mounted in such a manner that it can be moved diametrically of the rotary disc 22 as required. A rotary disc 23 is loosely mounted on the driving shaft of the motor 21 and a detecting coil 25 is fixed on the underside of the rotary disc 23 at a location corresponding to a magnet 24 which is fixed on the confronting surface of the rotary disc 22. The rotary disc 23 is driven from a motor 26 through the intermediary of an idler 27.

An image signal is imposed on an input terminal 28 and fed to a vertical synchronizing signal separating circuit 29 wherein a vertical synchronizing signal is separated from the image signal. The vertical synchronizing signal thus separated is led into a phase comparator 30 wherein the phase of the said vertical synchronizing signal is compared with the phase of a signal from the detecting head 25 which is synchronous with the rotational phase of the magnetic head 20. An output signal of the phase comparator 30 corresponding to the phase difference is supplied to the motor 21 to control the rotational phase thereof so as to conform it to the phase of the vertical synchronizing signal.

With the arrangement described, if the rotary disc 23 is held immovable, a signal of one field will be recorded by the magnetic head 20 upon 1 revolution of the said magnetic head. According to the invention the rotary disc 23 is rotated from the motor 26 at a peripheral speed corresponding to $(n+\tfrac{1}{2})H$ during the period of 1 revolution of the rotary disc 22.

Namely, the control system operates in such a manner that the equation $TV=(2\pi/Ws-Wd)$ (sec.) be established, wherein $Wd$ represents the rotational speed (radian/sec.) of the rotary disc 23, $Ws$ the rotational speed (radian/sec.) of the rotary disc 22 and $TV$ the period (sec.) of the vertical synchronizing signal. For example, if the rotary disc 23 is rotated at a speed of $$Wd=\frac{1}{2}\,\frac{WsTH}{TV}(2n+1)$$

radian/sec. in a direction opposite to the rotating direction of the rotary disc 22, the rotary disc 22 will rotate with a period which is delayed by a half of the period of the horizontal synchronizing signal from the period $TV$ of the vertical synchronizing signal, with respect to the magnetic recording medium 18.

Therefore, an unrecorded band 13 is formed for a period of $\tfrac{1}{2}(2n+\alpha-)H$ as shown in FIG. 2 and an effect similar to that obtained from the apparatus of FIG. 1 can be obtained.

It will be readily appreciated that the present invention is also applicable to the apparatus of FIGS. 1 and 3 wherein the disc-shaped magnetic recording medium 1 is replaced by a cylindrical one.

It is also to be noted that the rotational phase detecting means consisting of a magnet and a detecting head as described and illustrated herein may be composed of a combination of a light source and a photoelectric element.

What is claimed is:

1. A magnetic recording and reproducing apparatus of the type wherein about one field of a television signal for an interlaced scanning system is recorded by a magnetic head on a magnetic recording medium in the form of an annular track, and a static image signal is obtained by repeatedly reproducing the annular track during reproduction, said apparatus comprising a first driving system for rotating a first means selected from said magnetic head and said magnetic recording medium in order to produce a relative speed between said first means and a second means; detecting means for producing electric signals when said detecting means is at a predetermined position with respect to said first means; a second driving system for driving either said second means or said detecting means, centering around the rotating center of said first means, at a definite angular speed corresponding to an odd number times one-half of one horizontal synchronizing signal section of the television signal recorded in said recording medium at one rotating period of said first means; means for separating vertical synchronizing signals from said television signal to be recorded; phase comparator means for comparing the separated vertical synchronizing signals with the output of said detecting means to generate outputs correspond to the phase difference; and control means for controlling said first driving system so that the phase between the output of said detecting means and said vertical synchronizing signal of the television signal may be made the same.

2. A magnetic recording and reproducing apparatus of the type wherein about one field of a television signal for an interlaced scanning system is recorded by a magnetic head on a rotating magnetic recording medium in the form of an annular track, said apparatus comprising an element for detecting the rotational phase of said magnetic recording medium, said detecting element being rotated relative to said magnetic recording medium about an axis coaxial with the axis of rotation of said magnetic recording medium over a distance corresponding to a half of the recorded track formed on the magnetic recording medium by recording the horizontal synchronizing signal of said television signal multiplied by an odd number upon every revolution of said magnetic recording medium and emitting an electric signal when it is in a predetermined phase relation to said magnetic recording medium, and means for rotating said magnetic recording medium at such a rate that the phase of the output signal of said detecting element is maintained in a predetermined relation to the phase of the vertical synchronizing signal of said television signal.

3. A magnetic recording and reproducing apparatus of the type wherein about one field of a television signal for an interlaced scanning system is recorded by a magnetic head on a rotating magnetic recording medium in the form of an annular track, said apparatus comprising means for rotating said magnetic recording medium synchronously with the vertical synchronizing signal of said television signal at such a rate that it will complete 1 revolution in the period of one vertical synchronizing signal, and means for rotating said magnetic head about an axis coaxial with the axis of rotation of said magnetic recording medium at a constant rate over a distance corresponding to a half of the recorded track formed on the magnetic recording medium by recording the horizontal synchronizing signal of said television signal multiplied by an odd number during 1 revolution of said magnetic recording medium.

4. A magnetic recording and reproducing apparatus of the type wherein about one field of a television signal for an interlaced scanning system is recorded by a magnetic head on a fixed magnetic recording medium in the form of an annular track, said apparatus comprising a rotary disc for carrying said magnetic head in contact with said fixed magnetic recording medium, an element for detecting the rotational phase of said rotary disc, said detecting element being rotated relative to said rotary disc about an axis coaxial with the axis of rotation of said rotary disc over a distance corresponding to a half of the recorded track formed on the magnetic recording medium by recording the horizontal synchronizing signal of said television signal multiplied by an odd number upon every revolution of said rotary disc and emitting an electric signal when it is in a predetermined phase relation to said rotary disc, and means for controlling the rotation of said rotary disc in such a manner that the output of said detecting element and the vertical synchronizing signal of the television signal to be recorded be maintained in a predetermined phase relation to each other.

5. A magnetic recording and reproducing apparatus of the type wherein about one field of a television signal for an interlaced scanning system is recorded by a magnetic head on a rotating magnetic recording medium in the form of an annular track, said apparatus comprising means for rotating said magnetic head in contact with said magnetic recording medium in such a manner that it will complete 1 revolution in one vertical synchronizing signal period in synchronized relation to the vertical synchronizing signal of the television signal to be recorded, and means for controlling the rotation of said magnetic head in such a manner that it rotates about the axis of rotation thereof over a distance corresponding to a half of the recorded track of the horizontal synchronizing signal on said magnetic recording medium multiplied by an odd number.

* * * * *